United States Patent [19]

Gutierrez

[11] Patent Number: 5,312,077
[45] Date of Patent: May 17, 1994

[54] MOUNTING DEVICE

[76] Inventor: Manuel Gutierrez, 1273 Meadow Sweet Rd., Golden, Colo. 80401

[21] Appl. No.: 56,421

[22] Filed: May 3, 1993

[51] Int. Cl.⁵ ............................................. A47B 96/06
[52] U.S. Cl. .................................................. 248/214
[58] Field of Search ................ 248/214, 215, 218.4, 248/219.2, 220.2, 225.31, 231, 205.1, 300

[56] References Cited

U.S. PATENT DOCUMENTS

| | | | |
|---|---|---|---|
| 1,778,568 | 10/1930 | Schulte | 248/225.31 |
| 3,106,375 | 10/1963 | Donaldson | 248/300 X |
| 4,709,891 | 12/1987 | Barnett | 248/214 |
| 4,801,121 | 1/1989 | Zunker | 248/218.4 X |
| 5,213,299 | 5/1993 | Henry | 248/214 X |
| 5,236,162 | 8/1993 | Desjardins | 248/214 |

*Primary Examiner*—Ramon O. Ramirez
*Attorney, Agent, or Firm*—Dean P. Edmundson

[57] ABSTRACT

A mounting device is described which includes a channel having a top and spaced-apart sides. Registering openings are present in the sides. A key having elongated prongs is slidably received in the openings. The mounting device is useful in mounting a variety of objects (e.g., a fishing rod holder) to a desired substrate (e.g., a cleat, a rail, a block, etc.).

13 Claims, 7 Drawing Sheets

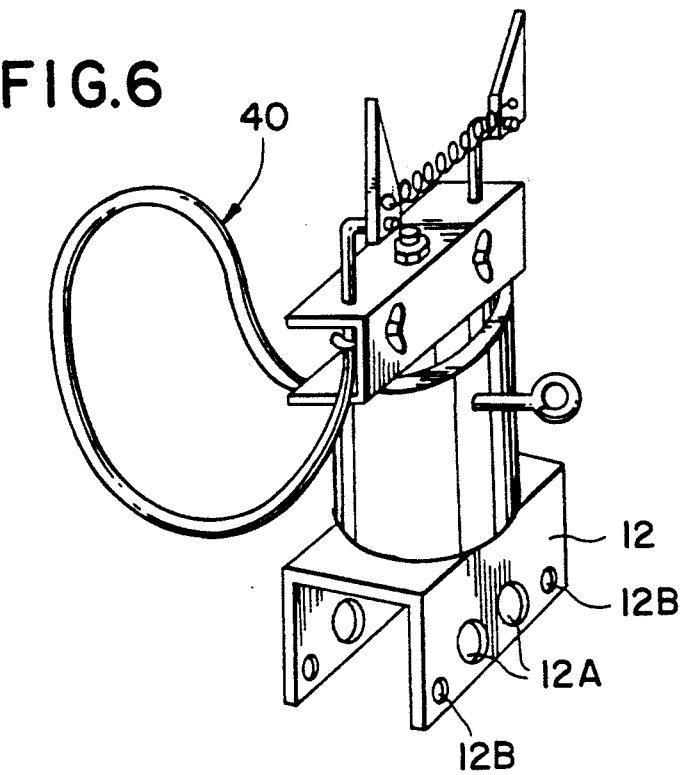
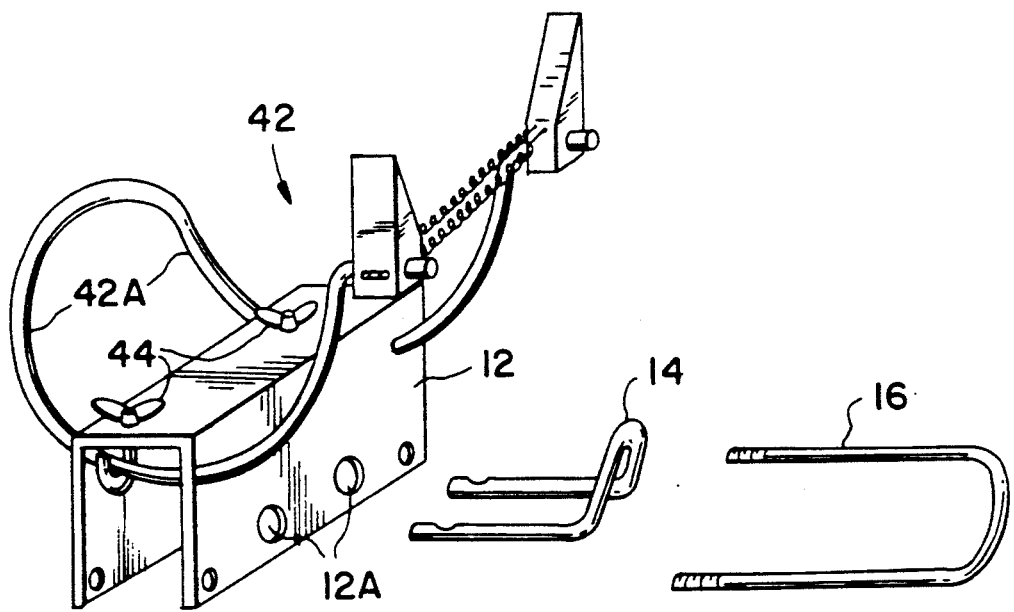

MOUNTING DEVICE

FIELD OF THE INVENTION

This invention relates to mounting devices. More particularly, this invention relates to devices and techniques for detachably mounting an object to a desired substrate or surface. Even more particularly, this invention relates to mounting devices for mounting a fishing rod holder or fishing rod stand to the existing fixtures of a boat or other desired support.

BACKGROUND OF THE INVENTION

It is often necessary or desirable to be mount an object to a substrate or other surface or existing fixtures on a surface. For example, while in a boat it is often necessary or desirable to mount a fishing rod holder to a boat existing fixture such as a cleat or a rail. Although some boats include openings for supporting a beverage container, and such cups can sometimes be used to receive the handle of a fishing rod, that is not entirely satisfactory.

Boats typically include cleats for the purpose of enabling the boats to be tied to docks, for example. There has not heretofore been provided a means for mounting objects to cleats. Boats and other vehicles often include rails extending along the sides, but there has not been provided a means for mounting objects to the rails.

SUMMARY OF THE INVENTION

In accordance with the present invention there is provided a mounting device for attachment to a cleat or a rail. Any desired object may be fastened or attached to the mounting device comprises:

In a preferred embodiment the mounting device comprises:

(a) a channel body member having spaced-apart, parallel sides and a top member connecting the parallel sides together; wherein the sides include a plurality of registering openings extending transversely therethrough; and (b) a key member having a plurality of elongated prongs for insertion through the registering openings in the parallel sides.

With the key member removed, the open side of the channel body can be placed over the cleat or rail, after which the key member can be inserted transversely through the registering openings in the sides of the channel body to thereby lock the mounting device to the cleat or rail. Then any desired object (e.g., a fishing rod holder) can be attached or secured to the channel body member. By simply removing the key member, the mounting device can be detached from the cleat or rail. No modification of the cleat or rail is required for use of the mounting device.

The mounting device of the invention is also useful for mounting a variety of objects to bed rails, e.g., hospital bed rails. For example, when a patient's bed is moved it is necessary for the patient's medication to also be moved with minimal disruption. In most cases the patient carries or holds the medications while being moved. The mounting device of the invention enables a tray or stand to be securely attached to a rail of the bed for supporting any necessary medications which must be moved with the patient. This is very convenient and expeditious.

The mounting device can also be easily attached to the handle bars or the frame of a bicycle or motorcycle to enable various objects to be carried thereon. The mounting device can also be used to attach various items to the roof rack of an automobile, for example.

Other advantages of the mounting device of the invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which:

FIG. 6 is a perspective view of a fishing rod holder attached to the mounting device of FIG. 1;

FIG. 7 is a perspective view of another embodiment of fishing rod holder attached to the mounting device of FIG. 1;

DETAILED DESCRIPTION OF THE INVENTION

Figure 1:
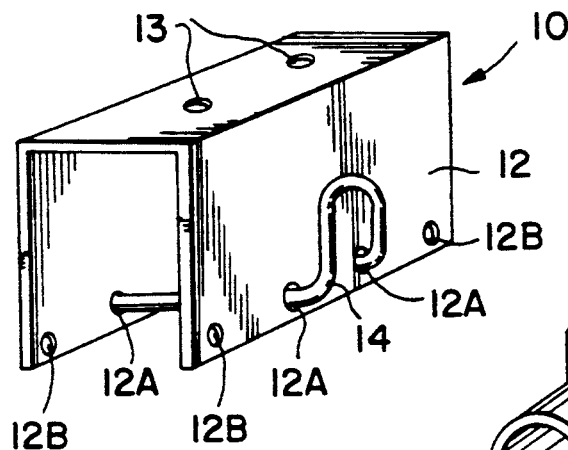
FIG. 1 is a perspective view of one embodiment of a mounting device of the invention.
Figure 2:
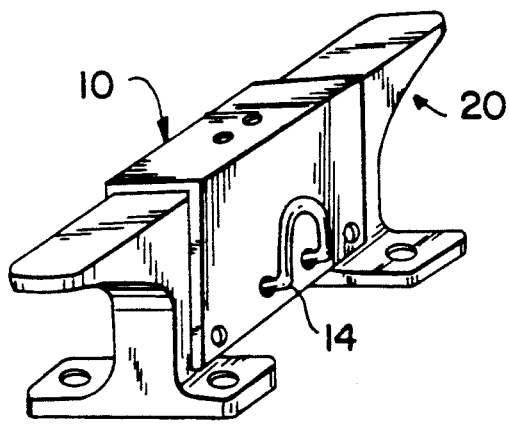
FIG. 2 is a perspective view of the mounting device of FIG. 1 mounted to a cleat (e.g., on a boat or other substrate)
Figure 4:
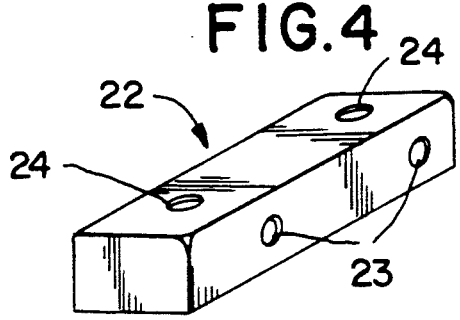
FIG. 4 is a perspective view of a mounting block to which the mounting device may be mounted.

In FIGS. 1 and 2 there is shown a preferred embodiment of mounting device 10 comprising a channel body member 12 having spaced-apart parallel sides and a top member connecting the two sides. Preferably the top member is perpendicular to the sides, as shown. It is also preferred for the sides and the top member to be generally planar.

The body member is preferably made of metal (e.g., aluminum) or it may be composed of plastic (e.g., Lexan, nylon, etc.) or it may be composed of separate layers of metal and plastic, for example.

Figure 3:
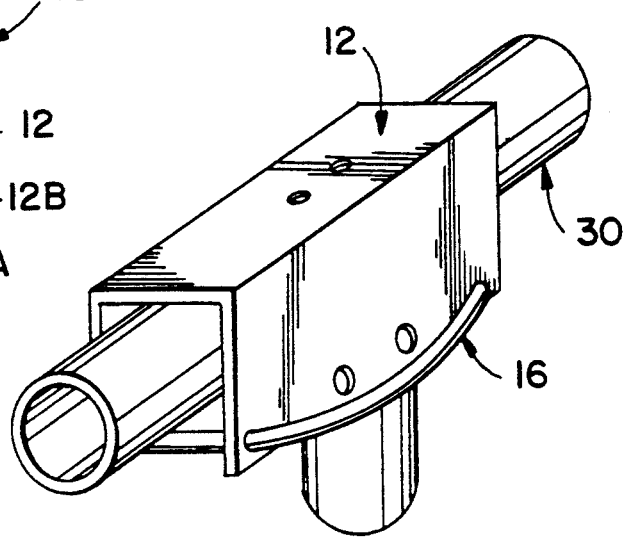
FIG. 3 is a perspective view of another embodiment of mounting device/of the invention mounted to a rail.

The two sides include registering apertures 12A for slidably receiving a key member 14 after the open bottom of the mounting body 12 has been positioned over a cleat 20 or other desired substrate. The key member secures the body 12 to the mounting substrate. Preferably the two sides also include registering apertures 12B which are spaced further apart than apertures 12A. A different key member may be used for inserting through apertures 12B in order to secure the body member to the desired substrate. This is illustrated in FIG. 3 where the body 12 is positioned over rail 30, and key member 16 is slidably received in the apertures 12B. The prongs of the key member extend below the rail 30 to retain the body 12 on the rail.

The top member of the body 12 can serve as an attachment surface or base on which any desired item may be secured (e.g., by screws or bolts passing through apertures 13). For example, a fishing rod holder can be secured to the top.

The mounting device may also be mounted to a mounting block 22 which includes transverse apertures 23 which extend through the block. The block may be secured to any desired substrate by bolts or screws extending through apertures 24.

Figure 5:
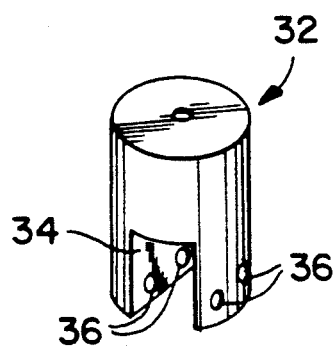
FIG. 5 is a perspective view of another type of mounting block/to which the mounting device may be attached.

Another embodiment of mounting device 32 is shown in FIG. 5 which is cylindrical and includes a notch or recess 34 in its lower side. The portion of the cylindrical body on opposite sides of the recess form legs for the device. Spaced-apart registering openings 36 extend transversely through the legs for slidably receiving a key member to connect the device to a desired mounting substrate. Any desired item may be secured to the top of the cylindrical body 32.

In FIG. 6 there is shown a fishing rod holder 40 which has been secured to the upper surface or top of a mounting device of FIG. 1. Apparatus of this type may be mounted to a cleat or rail of a boat, for example.

FIG. 7 illustrates another type of fishing rod holder 42 secured to the body member 12. In this embodiment the arms 42A of a fishing rod holder pass directly through openings in the side members of the body 12 and are secured in any desired position by means of J-bolts 44. The body 12 can be fastened to any desired mounting surface (e.g., a cleat or rail) by means of either key 14 or key 16. If desired, the free ends of key 16 may be threaded for enabling a nut or other threaded fastener to be attached after the key is inserted through body 12.

Figure 8:
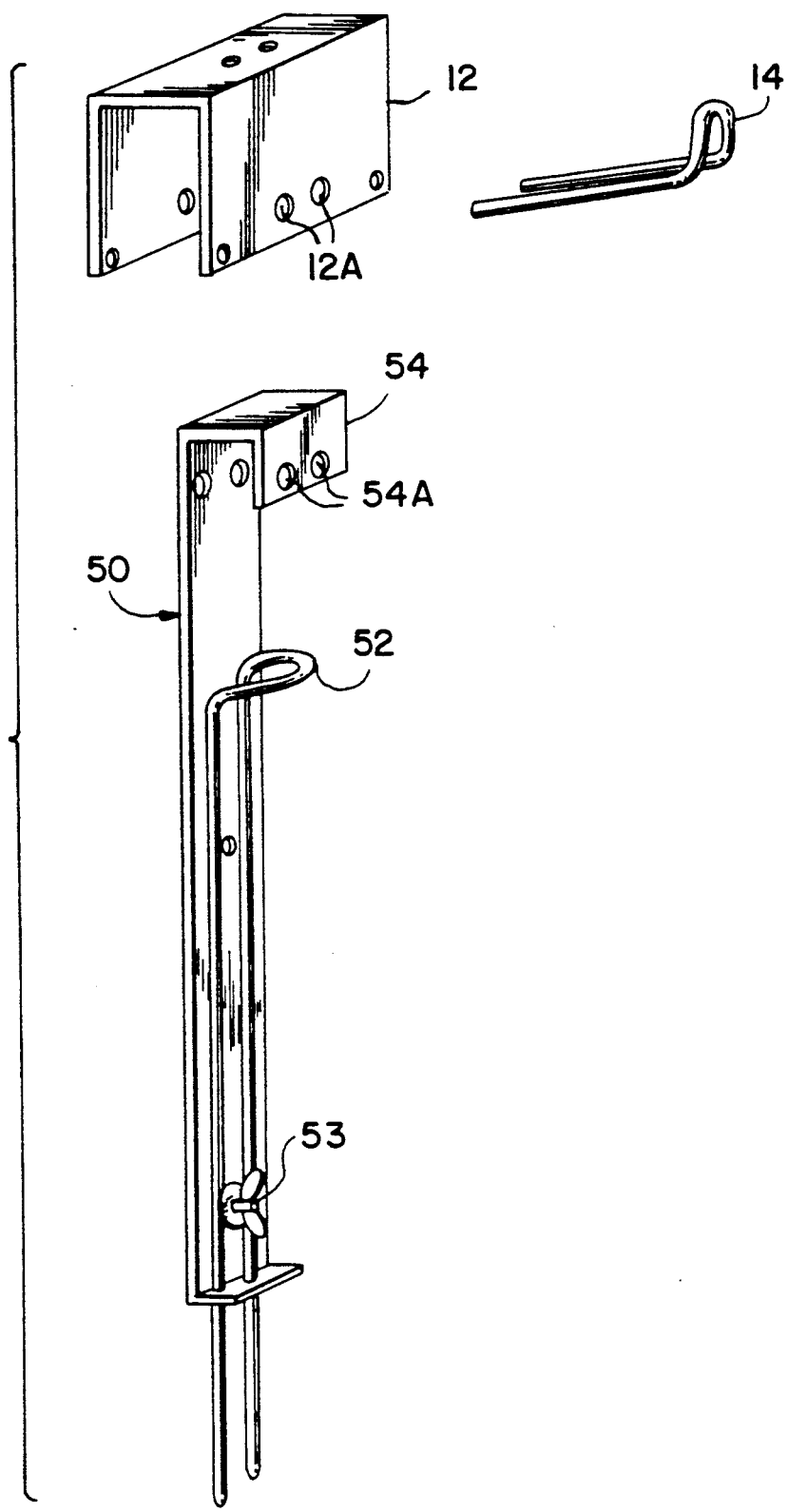
FIG. 8 is an exploded view showing the mounting device of FIG. 1 and a telescoping stand.

FIG. 8 is an exploded view showing the mounting device of FIG. 1 which can be attached to a telescoping stand 50, for example. Leg members 52 can be moved upwardly or downwardly and then secured in any desired position by means of bolt 53. The upper end 54 of the stand 50 includes spaced-apart apertures 54A. When the mounting device is positioned over the upper end 54 of the stand, the key 14 can be inserted through the registering openings 12A and 54A to secure to device 10 to the stand. Any desired device, e.g., a fishing rod holder, can be secured to the upper surface of the mounting device.

Figure 9:
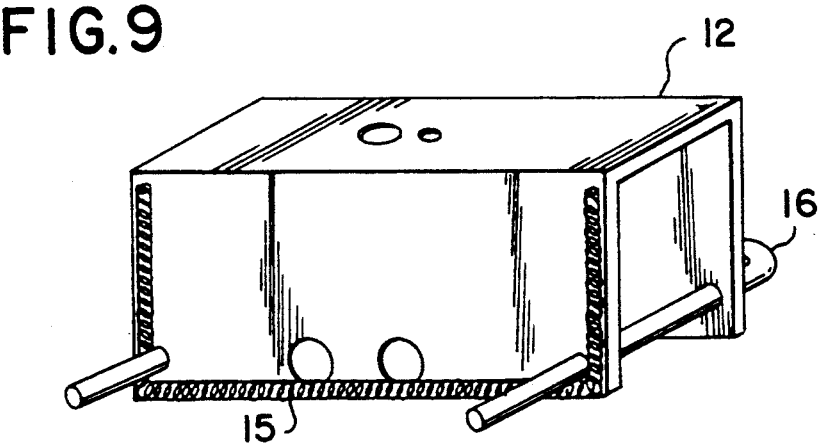
FIGS. 9-11 are perspective views of other embodiments of mounting devices of the invention.

FIG. 9 illustrates another embodiment of mounting device of the invention which further includes a spring member 15 which is secured at each of its ends to one of the sides of the body member 12. The spring can be extended around both legs of a key member 16 in order to retain the key member in its inserted position, as shown. Thus, the spring prevents the key from sliding out of the apertures of the body member due to vibration, for example.

Figure 10:
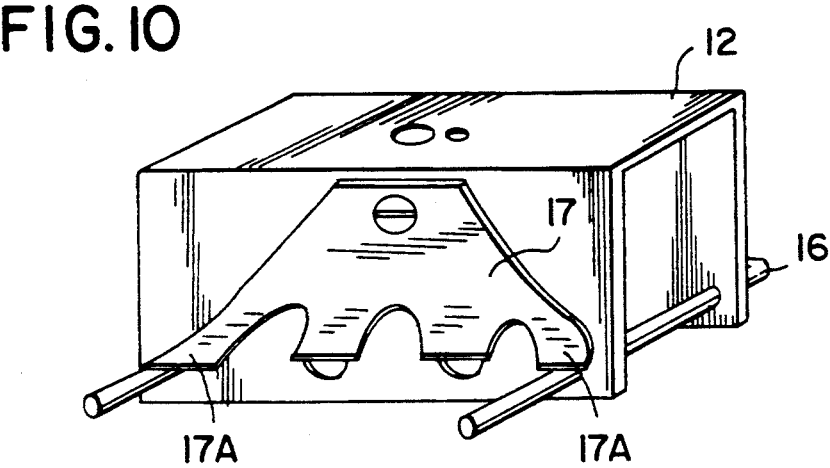
Figure 11:
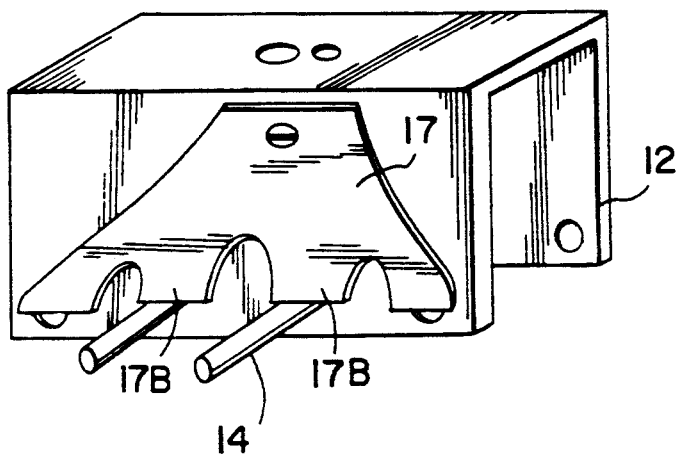

FIGS. 10 and 11 illustrate another type of retention member 17 which is secured to one side of the body 12. This type of retention member includes downwardly extending leg members 17A which are adjacent the apertures in the sides which receive the prongs of key member 16, and leg members 17B are adjacent the apertures in the sides which receive the prongs of key member 14. The lower edges of the legs 17A (and 17B) frictionally contact the prongs of the key members 16 (and 14) and prevent the key members from easily sliding out of the body member 12. If desired, the key members may include indentations or notches for engagement with the legs of the retention member.

Figure 12:
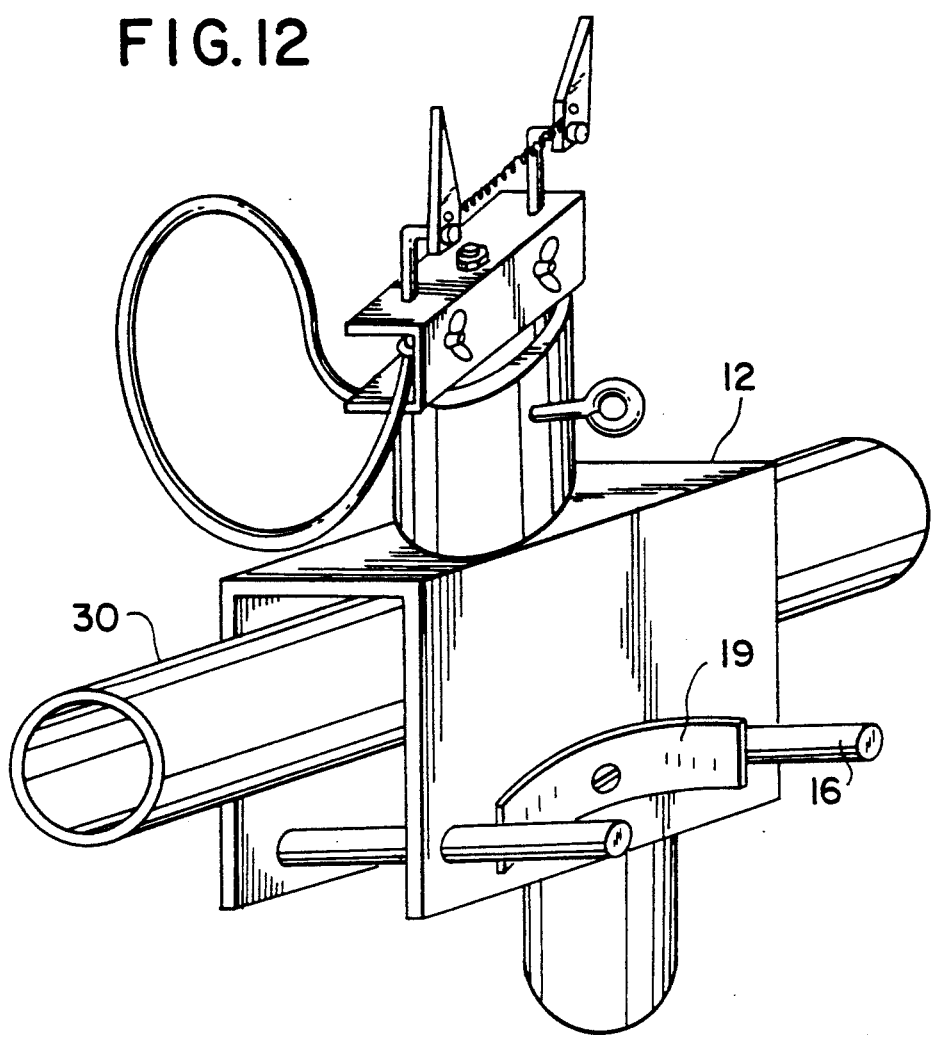
FIG. 12 is a perspective view of another embodiment of mounting device of the invention to which is attached a fishing rod holder, and wherein the mounting device is mounted to a rail.

FIG. 12 illustrates a fishing rod holder secured to a mounting device of the invention which includes another type of retention means to retain the key member 16 in the body member 12 (which is shown mounted on rail 30). The retention means comprises a curved spring band 19 whose ends frictionally engage the prongs of the key 16.

Figure 13:
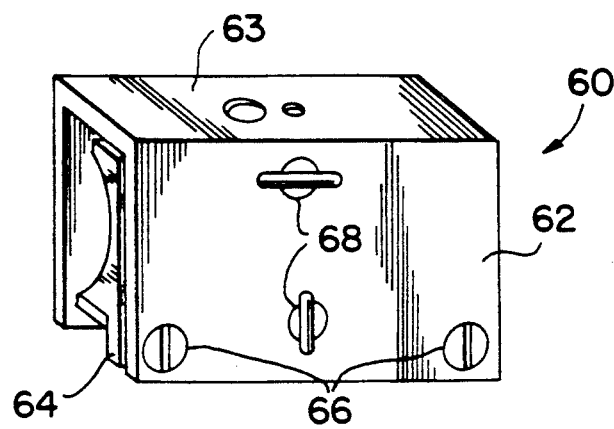
FIG. 13 is a perspective view of another embodiment of mounting device of the invention.

FIG. 13 is a perspective view showing another embodiment of mounting device 60 of the invention comprising channel body member 62 having spaced-apart parallel sides and a top member 63 connecting the two sides. Any desired component or device can be secured to the top of the body 62.

A movable plate member 64 is positioned in the channel between the two sides. The screws or eye bolts 68 engage the plate 64 and are adapted to move the plate away from the interior surface of one of the sides of body 62 and toward the opposite side. This is advantageous for causing the body 62 to firmly grip or more closely engage the substrate to which the body member is being attached. The screws or bolts 66 serve as key members to lock the body onto a desired cleat or rail. For this embodiment the bolts 66 may be threadably received in threaded openings in the back wall of the body 62 (or if such openings are not threaded, one may use threaded fasteners on the ends of bolt 66 to retain the bolts in place).

Figure 14:
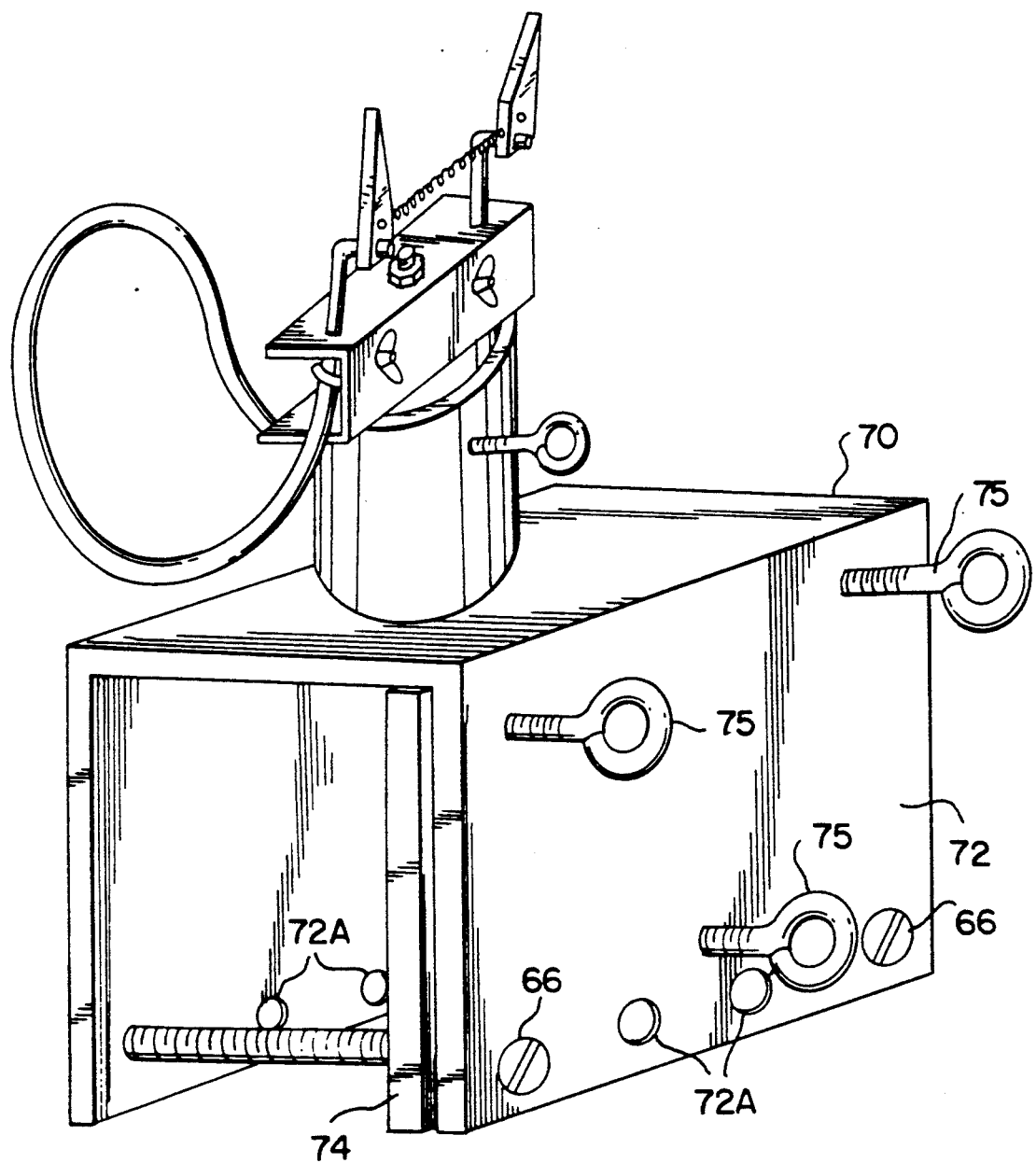
FIG. 14 is a perspective view of another embodiment of mounting device with a fishing rod holder secured thereto.

FIG. 14 illustrates a fishing rod holder secured to the top of another embodiment of mounting device 70 of the invention comprising body member 72. Plate member 74 is positioned between the sides of the body 72. Bolts or pins 66 extend between the sides of the body and retain the plate 74 within the body member. Bolts 66 also help to secure the body 72 to a desired substrate and also prevent or retard tilting of the body member relative to a substrate on which the body is mounted. By rotating the threaded bolts 75 in one direction the plate member is caused to move away from one side of the body to the other for the purpose of causing the body to firmly grasp or more closely engage the substrate to which it is being attached. Spaced-apart registering apertures 72A are for receiving a key member for attaching the body 72 to the desired substrate (e.g., a cleat on a boat).

Figure 15:
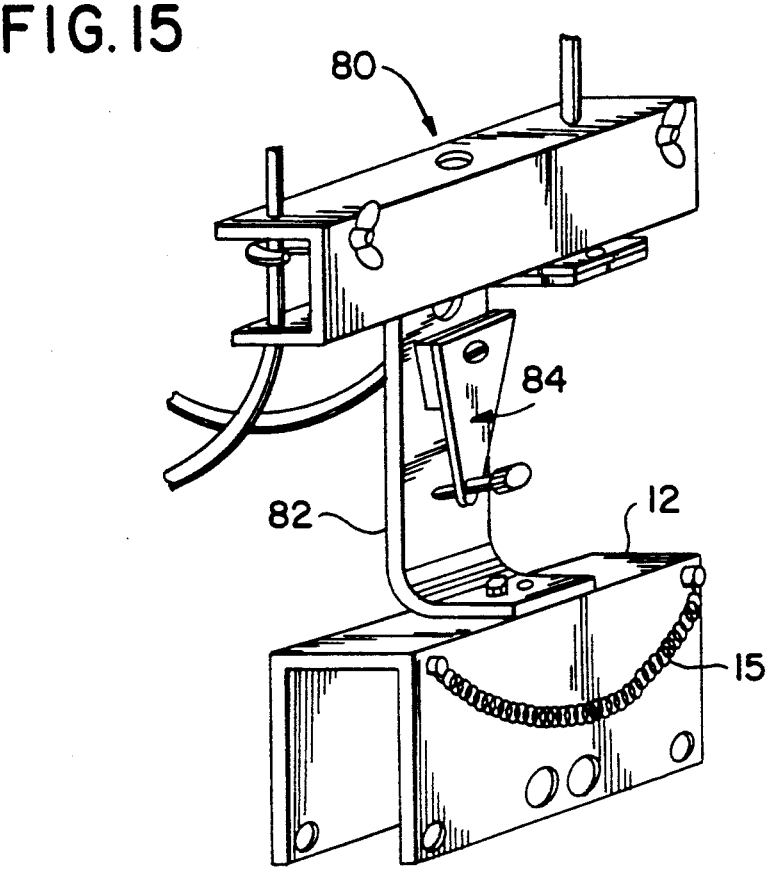
FIG. 15 is a perspective view illustrating another type of fishing rod holder secured to a mounting device of the invention.

FIG. 15 shows another type of fishing rod holder 80 secured to the top of a mounting device of the invention. The fishing rod holder includes a bracket 82 to which is attached an alarm system 84 for signalling when a fish strikes the line of a fishing rod supported in holder 80.

Figure 16:
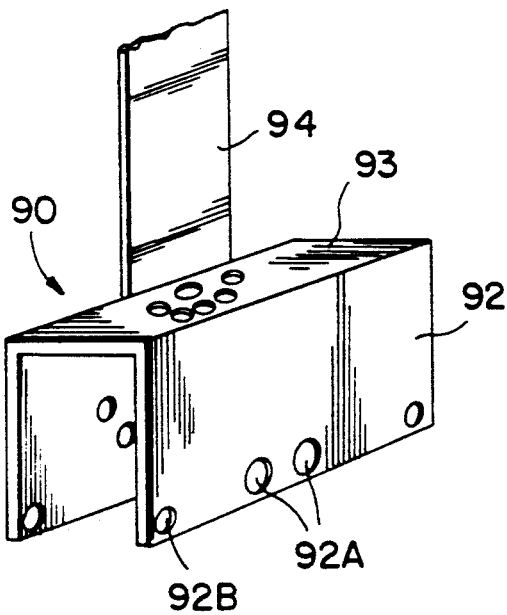
FIG. 16 is a perspective view of another embodiment of mounting device.
Figure 17:
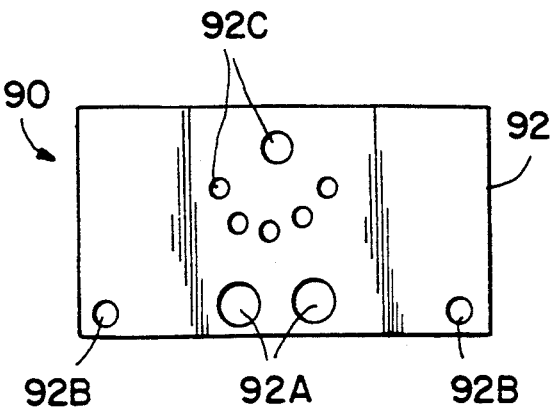
FIG. 17 is a side elevational view of the mounting device shown in FIG. 16.

FIGS. 16 and 17 illustrate another embodiment of mounting device 90 of the invention comprising a channel body member 92 having spaced-apart sides which include apertures 92A and 92B. The top member 93 includes apertures to facilitate attachment thereto of any desired component. One side of the body member includes apertures 92C to enable arm 94 to be attached thereto for locking side movements. Because there are several apertures 92C in an arc, the arm 94 can be secured thereto at any desired angle relative to the body.

Other variants are possible without departing from the scope of this invention. For example, the length, width and height of the body member may vary as desired.

What is claimed is:

1. A mounting device comprising:
   (a) a channel body member having spaced-apart, parallel sides and a top member connecting said parallel sides together; wherein said top member is planar and is perpendicular to said sides;
   (b) key means having a plurality of elongated prongs for insertion through said registering openings in said parallel sides; and
   (c) retention means for retaining said prongs in said openings.

2. In combination, a mounting device in accordance with claim 1 and a fishing rod stand attached to one of said parallel sides.

3. In combination, a mounting device of claim 1 and an elongated block member having opposing sides and a plurality of transverse openings extending through said block member between said sides; wherein said prongs of said key means extend through said registering openings in said channel body member and said transverse openings in said block member to secure said mounting device to said block member.

4. A mounting device in accordance with claim 1, wherein said retention means comprises a resilient plate secured to one side sides and include a surface which contacts said prongs adjacent said openings.

5. A mounting device in accordance with claim 1, wherein said retention means comprises a spring which is secured to one of said sides and which bears against said prongs.

6. A mounting device in accordance with claim 1, wherein said top member includes an opening extending therethrough.

7. In combination, a cleat member and a mounting device detachably connected to said cleat member; wherein said mounting device is in accordance with claim 1; wherein said cleat member is positioned between said parallel sides of said channel body member, and wherein said key member captures said cleat member within said channel body member.

8. A combination in accordance with claim 7, further comprising a fishing rod holder carried by said channel body member.

9. A mounting device in accordance with claim 1, further comprising:
   (a) a plate member positioned between said parallel sides;
   (b) adjustment means for selectively moving said plate member away from one of said sides toward the other said side.

10. A mounting device in accordance with claim 9, wherein said adjustment means comprises at least one threaded bolt member carried by one of said sides and being adapted to move said plate member in response to rotational movement of said bolt member.

11. In combination, an elongated rail member and a mounting device detachably connected to said rail member; wherein said mounting device comprises:
    (a) a channel body member having spaced-apart, parallel sides and a top member connecting said parallel sides together; wherein said sides include a plurality of registering openings extending transversely therethrough; and
    (b) a key member having a plurality of elongated prongs for insertion through said registering openings in said parallel sides;
    wherein said rail member is positioned between said parallel sides of said channel body member and wherein said key member captures said rail member within said channel body member.

12. A combination in accordance with claim 11, further comprising a fishing rod holder carried by said channel body member.

13. A method for detachably connecting a fishing rod holder to a cleat comprising the steps of:
    (a) providing a mounting device comprising
        (i) a channel body member having spaced-apart, parallel sides and a top member connecting said parallel sides together; wherein said sides include a plurality of registering openings extending transversely therethrough; and
        (ii) a key member having a plurality of elongated prongs for insertion through said registering openings in said parallel sides;
    (b) providing a fishing rod holder;
    (c) attaching said holder to said mounting device;
    (d) positioning said channel body member over said cleat in a manner such that said cleat is positioned between said parallel sides;
    (e) inserting said prongs of said key member through said openings in said sides to capture said cleat in said body member.

* * * * *